Patented June 4, 1946

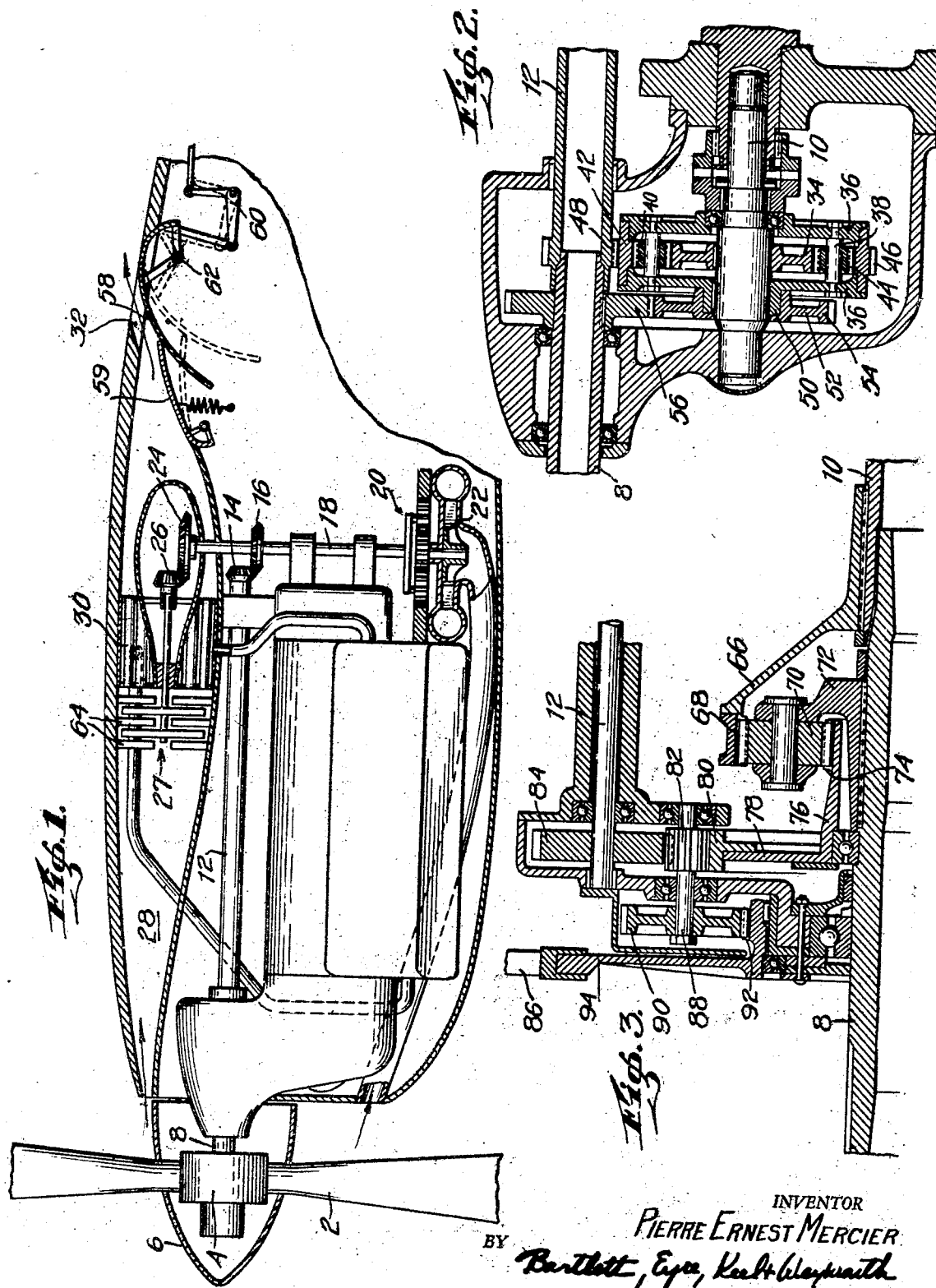

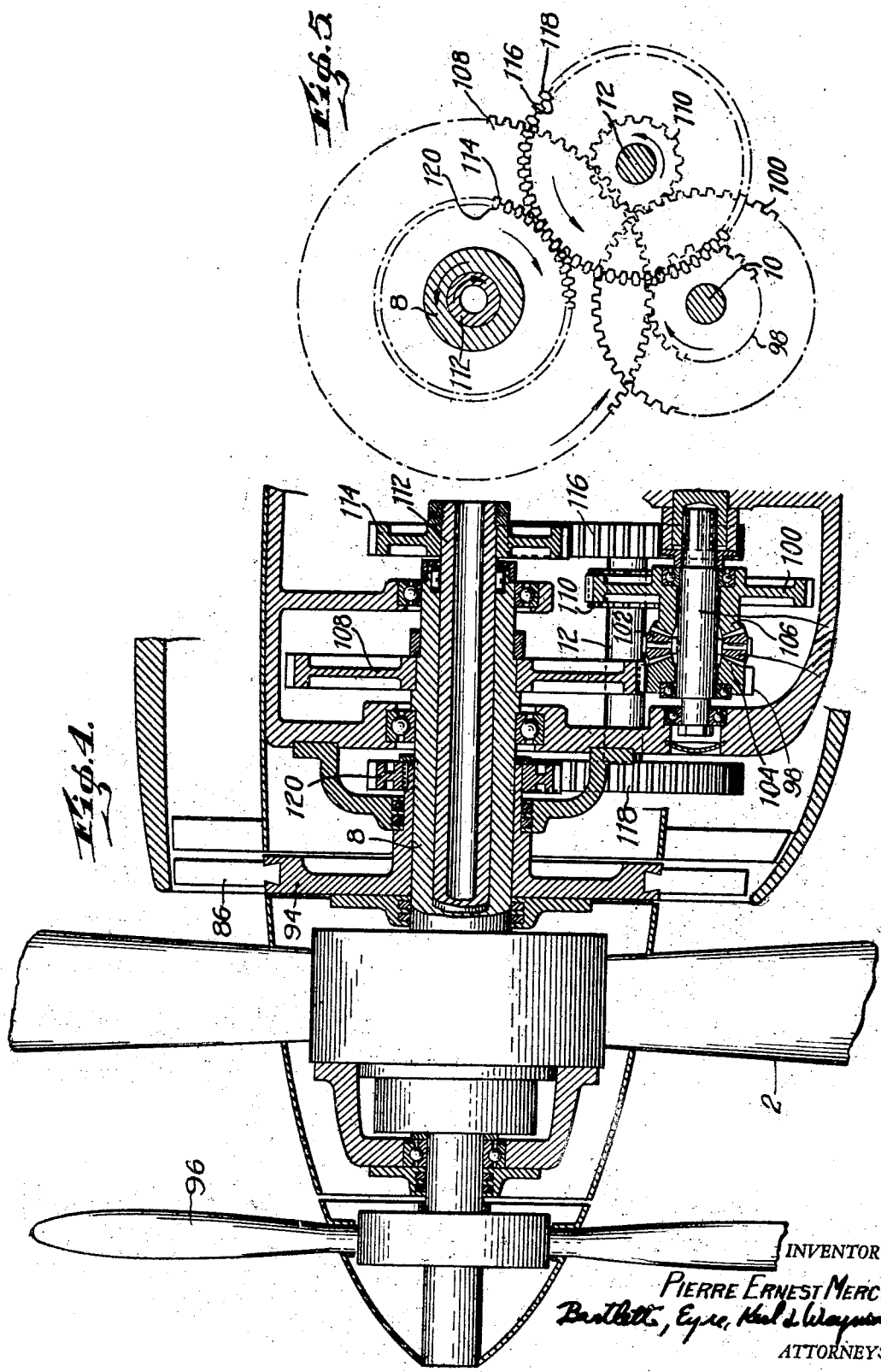

2,401,496

UNITED STATES PATENT OFFICE 2,401,496

POWER TRANSMISSION MECHANISM FOR AIRCRAFT ENGINES

Pierre Ernest Mercier, New York, N. Y., assignor to Stratos Corporation, Farmingdale, N. Y., a corporation of Delaware Application August 6, 1943, Serial No. 497,711

11 Claims. (Cl. 123—170)

The present invention relates to power transmission systems for aircraft engines and more specifically to mechanisms for driving aircraft accessories from the engine shaft and comprises novel apparatus for this purpose which, within reasonable limits, maintains the rotating speeds of aircraft accessories in any desired relation to the rotating speed of the engine shaft.

More specifically the mechanism of the present invention divides the torque available on the main shaft of the engine between the propeller and an auxiliary shaft, which shaft in turn drives, in parallel, two or more aircraft accessories such as the supercharger and the blower for delivering cooling air to the engine. That is, the present mechanism is such that the rotating speeds of the propeller shaft, or the auxiliary shaft, automatically vary in accordance with their respective power requirements in such manner as to maintain the division of the available torque determined by the mechanism.

Thus when the propeller is of the controllable pitch type and when automatic or manual means are provided for adjustment of the power required for driving one of the auxiliaries, for example the blower, the rotating speed of the parallel driven supercharger may be maintained at any desired value relative to the rotating speed of the engine shaft. Thus, in the system of the present invention the rotating speed of the auxiliary shaft is not fixed with relation to the engine shaft. For any fixed rotating speed of the engine shaft the rotating speed of the auxiliary shaft varies as an inverse function of the rotating speed of the propeller.

For an understanding of the invention reference may be had to the accompanying drawings, of which:

Fig. 1 is a side view, partly in section, of an aircraft engine and accessories driven thereby in accordance with the invention;

Fig. 2 is a sectional view of the transmission mechanism of Fig. 1;

Fig. 3 is a sectional view through mechanism illustrating another embodiment of the invention;

Fig. 4 is a sectional view through mechanism illustrating still another embodiment of the invention; and Fig. 5 is a diagrammatic view explanatory of the driving connections of Fig. 4.

In the embodiment of the invention illustrated in Figs. 1 and 2, a propeller 2 of the controllable pitch type, as indicated diagrammatically by the enclosure 4 within the spinner 6, is mounted on the propeller shaft 8 driven from the engine shaft 10 through the mechanism shown in Fig. 2. An auxiliary shaft 12 coaxial with the propeller shaft 8 and driven through the same mechanism, carries a conical gear 14 which, through a gear 16 drives a shaft 18. Shaft 18, through a multiplication gear assembly 20 drives a supercharger 22 and through conical gears 24 and 26 drives an axial blower 27. Blower 27 is positioned in the air intake passage 28 in advance of a radiator, the tubes of which are diagrammatically indicated at 30, through which is circulated the liquid for cooling the engine. The cooling air, after passage about the tubes 30 exhausts to atmosphere through the outlet 32.

As shown in Fig. 2 the mechanism for driving the propeller shaft 8 and auxiliary shaft 12 from the engine shaft 10 includes a central gear 34 keyed to the engine shaft, a pair of disks 36 rotatably mounted on the engine shaft and carrying therebetween axles 38 for satellite gears 40 engaging the central gear 34 and an annular member 42 rotatably carried by the disks 36 and having internal and external gears 44 and 46 respectively integral therewith. Internal gear 44 meshes with the satellites 40 and external gear 46 meshes with a gear 48 on the auxiliary shaft 12. One disk 36 is provided with a sleeve 50 to which is secured a wheel 52 carrying an external gear 54 which drives the propeller shaft 8 through a gear 56 secured thereto.

With the above described mechanism, the torque available on the engine shaft is divided between the propeller shaft and the auxiliary shaft, which latter shaft, as shown in Fig. 1 drives the supercharger and blower in parallel. The rotating speed of the auxiliary shaft 12, and hence of the supercharger 22, will depend upon the pitch of the propeller and upon the power required for driving the blower and supercharger. As the torque required for the proper operation of the supercharger is not necessarily in a constant ratio with the torque available on the engine shaft, means are provided for adjusting the power taken by the blower in order that the rotating speed of the supercharger may be maintained at any necessary value. Any suitable means for so adjusting the power taken by the blower may be employed. For example, as shown in Fig. 1 the power required by. the blower may be adjusted by the control of the cross-sectional area of the outlet 32 for the cooling air. For such control I have shown a wall section 58 of the passage 28 which is oscillatable, as by the lever arrangement 60, about an axis passing through a point 62. A portion of the surface of wall section 58 is an arc, the center of curvature of which is at the point 62. The remaining portion of the surface of wall section 58 is an arc of substantially longer radius of curvature. Hence when the section is oscillated about its axis at point 62 from the full line position indicated in Fig. 1, to the dotted line position the cross-sectional area of the outlet 32 is gradually increased, and hence the power required for driving the blower 26 is decreased. A hinged wall section 59, in advance of the section 58 and spring biased into engagement therewith maintains the continuity of the air passages in all positions of the section 58. Other means for varying the power required for the blower will occur to those skilled in the art. For example the vanes 64 associated with the movable blades of the blower 27 could be suitably adjusted.

In Fig. 3 another arrangement for driving the propeller shaft, auxiliary shaft and blower from the engine shaft is shown. In this arrangement the engine shaft 10, instead of the auxiliary shaft 12, is coaxial with the propeller shaft 8. In Fig. 3 the engine shaft 10 carries an element 66 bearing an internal gear 68 which meshes with satellites 70, the axles of which are borne by a carrier 72 secured to the propeller shaft 8. The satellites 70 on the other hand mesh with a central gear 74 carried by a member 76 rotatably mounted on the propeller shaft 8. Member 76 has a wheel 78 integral therewith and an external gear 80 on the wheel 78 drives the auxiliary shaft 12 through a pinion 82 and gear 84. It will be understood that the auxiliary shaft 12 drives the supercharger (not shown for convenience). Pinion 82 in addition to driving the auxiliary shaft 12 from the gear 80 also drives the blades 86 of the blower for delivering cooling air to the engine. As shown the pinion 82 is secured to a shaft 88 which also has secured thereto a gear 90. Gear 90 through a central gear 92 coaxial with the propeller shaft 8 drives the arms 94 carrying the blades 86 and integral with the gear 92.

Thus the mechanism of Fig. 3, like that of Figs. 1 and 2 divides the torque available on the engine shaft between the propeller shaft and two parallel driven aircraft accessories. As in Figs. 1 and 2 adjustment of the speed of the supercharger relative to that of the engine shaft may be effected by adjusting the power required for the blower, as for example by throttling the outlet passages as in Fig. 1, or by adjusting the pitch of the propeller or by both such adjustments.

The embodiment of the invention illustrated in Fig. 4 differs from those heretofore described in that the auxiliary shaft 12, in addition to driving the supercharger (not shown for convenience) drives two other aircraft accessories, namely the blower and a small propeller 96. Small propeller 96 may serve as one means for adjusting the power taken by the auxiliary shaft and hence as a means for insuring proper speed of the supercharger. In addition propeller 96 has some propulsive effect upon the airplane and hence insures that no energy is wasted in the maintenance of the supercharger speed at the correct value.

As shown in Figs. 4 and 5, the engine shaft 10 drives two gears 98 and 100, each rotatably mounted on the shaft 10, through satellites 102, the axles of which are carried by the shaft 10 and which mesh with crown gears 104 and 106 integral respectively with the gears 98 and 100. Gear 98 drives the shaft 8 of the main propeller 2 through a gear 108 and gear 100 drives the auxiliary shaft 12 through a gear 110. The shaft 112 of the small propeller 96 is journaled within the shaft 8 and extends rearwardly therebeyond. A gear 114 secured to the shaft 112 meshes with a gear 116 on the auxiliary shaft. A second gear 118 on the auxiliary shaft drives the blades 86 of the blower through a gear 120 rotatably mounted on shaft 8 and integral with the arms 94 carrying the blades 86. With the above described arrangement the small propeller 96 is driven counter to the main propeller 2 as will be apparent from the arrows of Fig. 5.

In the arrangement of Figs. 4 and 5, when the power required for driving the little propeller is reduced, as by adjustment of the pitch thereof, the rotating speed of the auxiliary shaft and therefore of the supercharger relative to that of the engine shaft will be increased and conversely, when the power required for driving the little propeller is increased, the relative rotating speed of the shaft 12 is decreased. If desired additional means for regulation of the supercharger speed, as by adjustment of the power required by the blower could be employed.

From the foregoing description of the invention and of the several specific embodiments thereof, it will be apparent that the invention provides an efficient power transmission mechanism for driving the propeller and various aircraft auxiliaries, including the supercharger, from the engine shaft and provides for the control of the rotating speed of the supercharger relative to that of the engine by adjustment of the pitch of the propeller and of the power required by an auxiliary driven in parallel with the supercharger. In each embodiment of the invention the described control of the rotating speed of the supercharger relative to that of the engine by adjustment either of the pitch of a propeller or of the power required for driving the blower, involves no waste of power in the system as in each case any reduction in the power delivered to the supercharger results in a corresponding gain in propulsive effect of the airplane.

In each embodiment of the invention the transmission mechanism between the engine shaft and the propeller and auxiliary shafts includes two gears coupled together by satellites borne by a carrier, each of the two gears and the carrier rotating at a speed fixed with relation to one of the three shafts. In Figures 2 and 3 the rotating speed of the propeller shaft is fixed with relation to the carrier, the carrier in Fig. 2 being integral with the gear driving the propeller shaft and being integral with that shaft in Fig. 3. In Fig. 4 it is the rotating speed of the engine shaft which bears a fixed relation to that of the carrier, the carrier in this case being secured to the engine shaft.

It will be understood, however, that the invention in its broadest scope is not limited to the particular mechanism disclosed as changes might be made therein without departing from the spirit of the invention as defined in the appended claims.

I claim:

1. In an aircraft, an engine and a shaft driven thereby, a propeller and a shaft therefor, auxiliary driving means, a supercharger and at least one other aircraft accessory driven in parallel thereby, a mechanism for transmitting power from the engine shaft to the propeller shaft and to said auxiliary driving means so as to maintain a predetermined division of the available torque therebetween, and means for adjusting the power required for driving one of said auxiliaries to vary the rotating speed of the supercharger relative to that of the engine.

2. In an aircraft, an engine and a shaft driven thereby, a controllable pitch propeller and a shaft therefor, a driven member, a supercharger and at least one other aircraft accessory driven in parallel from said driven member, and a mechanism for transmitting power from the engine shaft to the propeller shaft and to said driven member for driving the same, said mechanism including means for maintaining a predetermined division of the torque available on the engine shaft between the propeller shaft and said driven member whereby the rotating speed of the supercharger relative to the engine speed may be controlled by adjustment of the pitch of the propeller.

3. In an aircraft, an engine and a shaft driven thereby, a controllable pitch propeller and a shaft therefor, an auxiliary shaft, a supercharger and at least one other aircraft auxiliary driven in parallel thereby, power transmission mechanism for driving the propeller shaft and the auxiliary shaft from the engine shaft, said mechanism including a gear rotating in fixed relation with one of said three shafts, a gear rotating in fixed relation with a second one of said three shafts, a satellite carrier rotating in fixed relation with the third shaft, satellite gears borne by said carrier and meshing with both of said gears whereby the torque available on the engine shaft is divided between the propeller shaft and the auxiliary shaft and means associated with an auxiliary for adjusting the power required for driving the same whereby the rotating speed of the supercharger relative to that of the engine may be controlled by said means and by adjustment of the pitch of said propeller.

4. The combination according to claim 3 wherein said satellite carrier rotates in fixed relation with the propeller shaft.

5. The combination according to claim 3 wherein said satellite carrier is secured to the propeller shaft and the gear rotating in fixed relation to the engine shaft is an internal gear secured thereto.

6. The combination according to claim 3 wherein said satellite carrier is rotatably mounted on the engine shaft and has a gear secured thereto for driving the propeller shaft and wherein the gear rotating in fixed relation to the engine shaft is a central gear secured to the engine shaft and the gear rotating in fixed relation with the auxiliary shaft is an internal gear and has an external gear secured thereto for driving the auxiliary shaft.

7. The combination according to claim 3 wherein said satellite carrier is secured to the engine shaft and said other gears are crown gears rotatably mounted on the engine shaft, each of said crown gears having an external gear secured thereto for driving the respective propeller shaft and auxiliary shaft.

8. In an aircraft, an engine and a shaft driven thereby, a controllable pitch propeller and a shaft therefor, a supercharger for the engine, a blower for delivery of cooling air to the engine, power transmission mechanism for driving the propeller, and supercharger and the blower from the engine shaft, said mechanism including as elements thereof two gears and a satellite carrier, said mechanism including also satellite gears borne by said carrier and meshing with said gears, one of said elements being driven by the engine shaft, another of said elements driving the propeller shaft and the third of said elements driving said blower and supercharger in parallel, and means for adjusting the power required for driving the blower.

9. The combination according to claim 8 wherein said last mentioned means comprises a movable wall section in the outlet passage for the cooling air delivered by the blower, and means for moving the said wall section to vary the size of the outlet passage and thereby vary the resistance to the flow of air therethrough.

10. In an aircraft, an engine and a shaft driven thereby, a controllable pitch main propeller and a shaft therefor, an auxiliary shaft, a supercharger driven thereby, a small air screw, a shaft therefor driven from said auxiliary shaft, and power transmission mechanism for driving the main propeller shaft and the auxiliary shaft from the engine shaft, said mechanism dividing the torque available on the engine shaft in a predetermined ratio between the main propeller and auxiliary shafts whereby the rotating speed of the supercharger and of the small air screw relative to that of the engine shaft may be varied by adjustment of the pitch of the main propeller.

11. The combination according to claim 10 including a blower for delivering cooling air to the engine and means for driving said blower from said auxiliary shaft.

PIERRE ERNEST MERCIER.